United States Patent
Lin

(10) Patent No.: US 9,172,470 B2
(45) Date of Patent: Oct. 27, 2015

(54) COMMUNICATION DEVICE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 37 days.

(21) Appl. No.: 14/067,985

(22) Filed: Oct. 31, 2013

(65) Prior Publication Data

US 2015/0110498 A1     Apr. 23, 2015

(30) Foreign Application Priority Data

Oct. 22, 2013  (TW) ................................. 102137998

(51) Int. Cl.
*H04B 10/40*     (2013.01)
(52) U.S. Cl.
CPC ..................................... *H04B 10/40* (2013.01)

(58) Field of Classification Search
CPC ................. H04B 10/40; G02B 6/2938; G02B 69/29395; G02B 6/32; G02B 6/4226
See application file for complete search history.

(56) References Cited

U.S. PATENT DOCUMENTS

| | | | |
|---|---|---|---|
| 6,339,503 B1 * | 1/2002 | Derstine et al. | 359/622 |
| 2002/0033980 A1 * | 3/2002 | Lo | 359/152 |
| 2014/0186032 A1 * | 7/2014 | Louderback | 398/38 |

* cited by examiner

*Primary Examiner* — David Payne
*Assistant Examiner* — Casey Kretzer
(74) *Attorney, Agent, or Firm* — Novak Druce Connolly Bove + Quigg LLP

(57) ABSTRACT

A communication device includes four signal sending chips, four signal receiving chips, a first optical module and a second optical module. Each of the first optical module and the second optical module includes a main body and four lenses formed on the main body. The first optical module has four signal sending channels corresponding to the four lenses thereof, and the second optical module has four signal receiving channels corresponding to the four lenses thereof. The first optical module and the second optical module are individual from each other.

19 Claims, 4 Drawing Sheets

COMMUNICATION DEVICE

BACKGROUND

1. Technical Field

The disclosure generally relates to communication devices, and more particularly to an optical communication device.

2. Description of Related Art

QSFP (Quad Small Form-Factor pluggable) module is used widely for transmitting a larger amount of data. A typical QSFP module has four signal receiving channels and four signal sending channels each of which can transmit 10 Gbps data. Thus, the QSFP module has a total data transmitting capability of 40 Gbps.

Nowadays, the QSFP module is generally used with an optical module having twelve channels. The optical module has twelve lenses corresponding to the twelve channels. The twelve lenses are arranged in a line, wherein four left lenses are used to send signals, and four right lenses are used to receive signals. Thus, four signal sending channels and four signal receiving channels are formed in the optical module. However, the lenses need to be arranged densely due to too many lenses incorporated to the optical module. The manufacturing precision of the optical module is thus relatively high, resulting in a high cost of the optical module.

What is needed, therefore, is a communication device which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
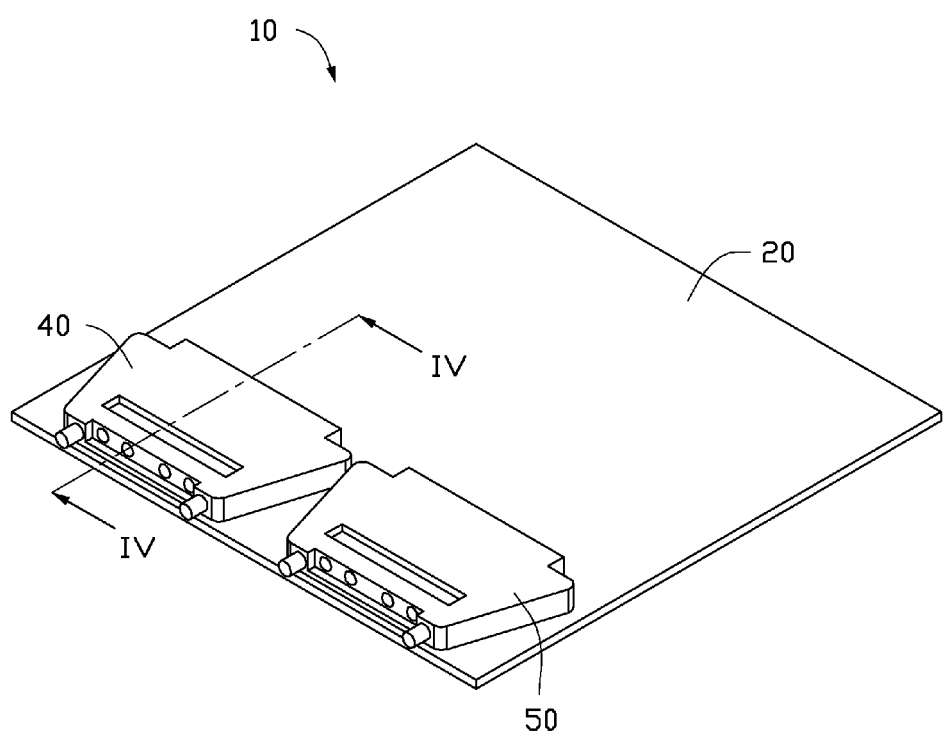
FIG. 1 is an isometric view of a communication device in accordance with an embodiment of the present disclosure.
Figure 2:
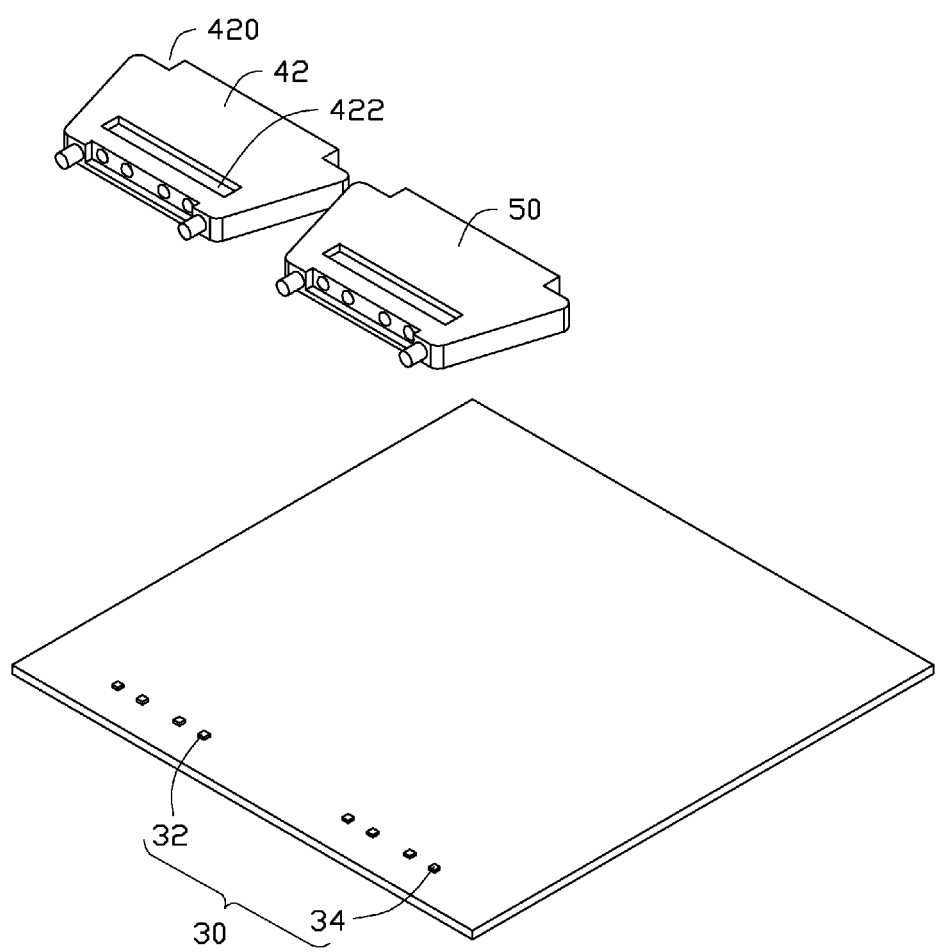
FIG. 2 is an exploded view of the communication device of FIG. 1.
Figure 3:
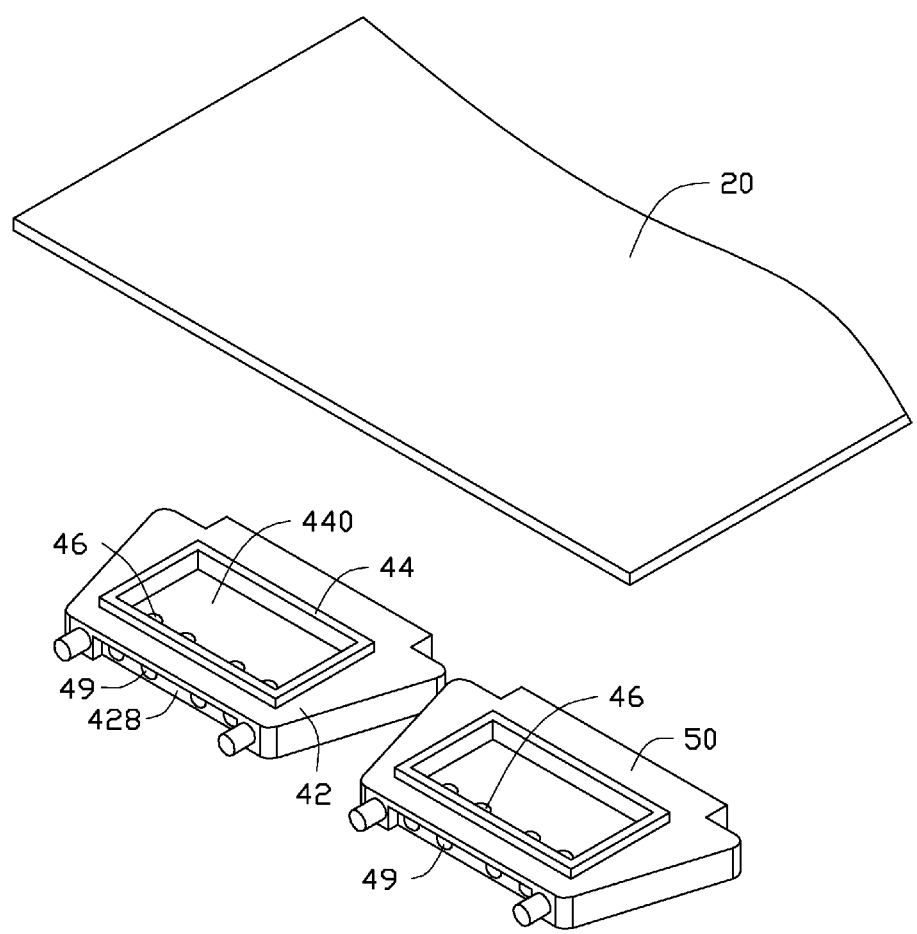
FIG. 3 is an inverted view of the communication device of FIG. 2.

Referring to FIGS. 1-3, a communication device 10 in accordance with an embodiment of the present disclosure is shown. The communication device 10 is used with a QSFP (Quad Small Form-Factor Pluggable) module for transmitting data. The communication device 10 includes a base 20, eight chips 30 mounted on the base 20, a first optical module 40 and a second optical module 50 covering the eight chips 30.

The base 20 may be a circuit board for supplying power for the eight chips 30. The eight chips 30 are electrically connected to the base 20. Four left chips 30 are signal sending chips 32, and four right chips 30 are signal receiving chips 34. The four signal sending chips 32 are uniformly fixed in a left area of a top face of the base 20, and the four signal receiving chips 34 are uniformly fixed in a right area of the top face of the base 20. The four signal sending chips 32 and the four signal receiving chips 34 are all arranged in a line.

The first optical module 40 is disposed on the left area of the top face of the base 20 and covers the four signal sending chips 32. The second optical module 50 is disposed on the right area of the top face of the base 20 and covers the four signal receiving chips 34. The first optical module 40 is spaced from the second optical module 50. The first optical module 40 has four signal sending channels, and the second optical module 50 has four signal receiving channels. The first optical module 40 and the second optical module 50 have the same material, shape and configuration, whereby only the first optical module 40 is discussed below for brevity.

Figure 4:
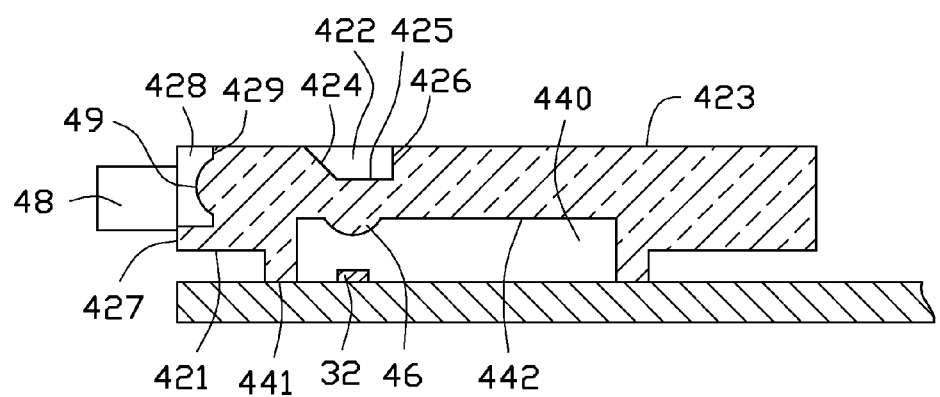
FIG. 4 shows a cross section of a first optical module of the communication device of FIG. 1, taken along line IV-IV thereof.

Also referring to FIG. 4, the first optical module 40 is made of transparent material such as polycarbonate or polymethyl methacrylate. The first optical module 40 includes a main body 42 covering the four signal sending chips 32. The main body 42 has a trapezoid shape with two rear corners cut away. The main body 42 forms a frame 44 in a bottom face 421 thereof. The frame 44 is rectangular and annular. The frame 44 protrudes downwardly from the bottom face 421 of the main body 42. A bottom face 441 of the frame 44 is disposed on the top face of the base 20 for supporting the first optical module 40. The frame 44 encloses a rectangular cavity 440 in the bottom face 421 of the main body 42. The cavity 440 has a depth larger than a height of the frame 44. An inner top face 442 of the main body 42 defining a top of the cavity 440 is higher than the bottom face 421 of the main body 42. The inner top face 442 of the main body 42 is parallel to the bottom face 421 of the main body 42. The four signal sending chips 32 are received in the cavity 440. Four lenses 46 are formed on the inner top face 442 of the main body 42. The four lenses 46 are arranged in a line. Each lens 46 is a curved convex lens protruding downwardly. The four lenses 46 are located corresponding to the four signal sending chips 32 and the four signal sending channels, respectively. Each lens 46 can converge light emitted from a corresponding signal sending chip 32 into the first optical module 40 upwardly.

The main body 42 further defines a groove 422 in a top face 423 thereof. The groove 422 is enclosed by an inner lateral face 424, an inner bottom face 425 and an inner side face 426 of the main body 42. The groove 422 has a depth less than that of the cavity 440. The inner bottom face 425 is higher than the inner top face 442. The inner bottom face 425 is parallel to the inner top face 423, and perpendicular to the inner side face 426. The inner lateral face 424 is inclined relative to the inner bottom face 425 and the inner side face 426. The inner lateral face 424 extends upwardly and outwardly from the inner bottom face 425 to the top face 423 of the main body 42. The inner lateral face 424 acts as a light reflective face to reflect the light converged from the lens 46 towards a front face 427 of the main body 42 horizontally.

The main body 42 defines a slot 428 in the front face 427 thereof. Four lenses 49 are formed in an inner rear face 429 of the main body 42 defining a rear of the slot 428. A depth of the slot 428 is less than that of the groove 422. The four lenses 49 are also arranged in a line. The four lenses 49 are located corresponding to the four lenses 46 and the four signal sending channels. Each lens 49 is a curved convex lens protruding in a direction away from the groove 422. Each lens 49 further converges the light reflected by the reflective face to radiate out of the first optical module 40. Two posts 48 are formed on the front face 427 of the main body 42. The two posts 48 are located at two opposite sides of the slot 428.

The second optical module 50 has a reversed function relative to the first optical module 40. The second optical module 50 converges outside light by the lenses 49, reflects the light by the reflective face, and finally converges the light to the signal receiving chips 34 by the lenses 46.

Each of the first optical module 40 and the second optical module 50 incorporates less lenses in each line, and the first optical module 40 and the second optical module 50 are individual from each other, whereby the lenses 46, 49 can be arranged more rarely from each other. Thus, the first optical module 40 and the second optical module 50 do not need high precise manufacturing technology, thereby lowering manufacturing cost of the communication device 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A communication device comprising:
    a plurality of signal sending chips and signal receiving chips;
    a first optical module covering the signal sending chips, the first optical module having a plurality of signal sending channels and a plurality of lenses corresponding to the signal sending channels;
    a second optical module covering the signal receiving chips, the second optical module having a plurality of signal receiving channels and a plurality of lenses corresponding to the signal receiving channels; and
    wherein the first optical module is individual from the second optical module;
    wherein the first optical module comprises a main body defining a cavity in a bottom face thereof, the signal sending chips being received in the cavity; and
    wherein the main body forms a light reflective face at a top face thereof, the light reflective face being inclined relative to the bottom face of the main body.

2. The communication device of claim 1, wherein the main body defines a groove in the top face thereof, the light reflective face being formed in the groove.

3. The communication device of claim 2, wherein the groove has a depth less than that of the cavity.

4. The communication device of claim 2, wherein the groove has a depth larger than that of the slot.

5. The communication device of claim 1, wherein the additional lenses converge signal from the signal sending chips to the light reflective face, and the light reflective face reflects the signal to the lenses which converge the signal to an outside of the first optical module.

6. A communication device comprising:
    a plurality of signal sending chips and signal receiving chips;
    a first optical module covering the signal sending chips, the first optical module having a plurality of signal sending channels and a plurality of lenses corresponding to the signal sending channels;
    a second optical module covering the signal receiving chips, the second optical module having a plurality of signal receiving channels and a plurality of lenses corresponding to the signal receiving channels; and
    wherein the first optical module is individual from the second optical module;
    wherein the first optical module comprises a main body defining a cavity in a bottom face thereof, the signal sending chips being received in the cavity, the first optical module further comprises a plurality of additional lenses formed in the cavity, the additional lenses facing the signal sending chips, respectively, the plurality of lenses are formed outside the cavity of the main body; and
    wherein the first optical module defines a slot in a front face thereof, the plurality of lenses being received in the slot, the main body forms a light reflective face at a top face thereof, the light reflective face being inclined relative to the bottom face of the main body.

7. The communication device of claim 6, wherein the first optical module has a configuration same as the second optical module.

8. The communication device of claim 6, wherein the first optical module and the second optical module are made of transparent material.

9. The communication device of claim 6, wherein the first optical module is spaced from and does not contact the second optical module.

10. The communication device of claim 6, wherein the first optical module further comprises a frame protruding downwardly from the bottom face of the main body, the cavity being enclosed by the frame.

11. The communication device of claim 10, wherein the cavity has a depth larger than a height of the frame.

12. The communication device of claim 10 further comprising a base supporting the signal sending chips and the signal receiving chips, wherein the frame of the first optical module is disposed on the base.

13. The communication device of claim 6, wherein the additional lenses are arranged in a line.

14. The communication device of claim 6, wherein the first optical module comprises two posts formed on the front face of the main body, the two posts being located at two opposite sides of the slot.

15. The communication device of claim 6, wherein the main body defines a groove in the top face thereof, the light reflective face being formed in the groove.

16. The communication device of claim 15, wherein the groove has a depth less than that of the cavity.

17. The communication device of claim 15, wherein the groove has a depth larger than that of the slot.

18. The communication device of claim 6, wherein the additional lenses converge signal from the signal sending chips to the light reflective face, and the light reflective face reflects the signal to the lenses which converge the signal to an outside of the first optical module.

19. The communication device of claim 6, wherein the signal sending chips, the plurality of lenses and the additional lenses have the same number of four.

* * * * *